United States Patent
Elo et al.

(10) Patent No.: US 8,420,562 B2
(45) Date of Patent: *Apr. 16, 2013

(54) PROCESS FOR THE PREPARATION OF AN UNSUPPORTED, SOLID METALLOCENE CATALYST SYSTEM AND ITS USE IN POLYMERIZATION OF OLEFINS

(75) Inventors: Pertti Elo, Helsinki (FI); John Severn, Eindhoven (NL); Peter Denifl, Helsinki (FI); Soile Rautio, Porvoo (FI); Marja Mustonen, Koskenkylän saha (FI); Anu-Leena Hongell, Vantaa (FI)

(73) Assignee: Borealis AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 12/998,627

(22) PCT Filed: Nov. 4, 2009

(86) PCT No.: PCT/EP2009/064613
§ 371 (c)(1),
(2), (4) Date: May 10, 2011

(87) PCT Pub. No.: WO2010/052239
PCT Pub. Date: May 14, 2010

(65) Prior Publication Data
US 2011/0213108 A1    Sep. 1, 2011

(30) Foreign Application Priority Data

Nov. 10, 2008  (EP) .................................... 08168708

(51) Int. Cl.
*B01J 31/22* (2006.01)
*C08F 4/642* (2006.01)
*C08F 4/6592* (2006.01)

(52) U.S. Cl.
USPC ........... 502/104; 502/103; 502/107; 502/152; 526/160; 526/165; 526/348; 526/943

(58) Field of Classification Search .................. 526/160, 526/165, 348, 943; 502/103, 152, 104, 107
See application file for complete search history.

(56) References Cited

U.S. PATENT DOCUMENTS

| | | |
|---|---|---|
| 4,003,712 A | 1/1977 | Miller |
| 4,302,566 A | 11/1981 | Karol et al. |
| 4,511,704 A | 4/1985 | Tanaka et al. |
| 4,588,790 A | 5/1986 | Jenkins, III et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 4,975,485 A | 12/1990 | Sato et al. |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,290,745 A | 3/1994 | Jorgensen et al. |
| 5,308,815 A | 5/1994 | Sangokoya |
| 5,329,032 A | 7/1994 | Tran et al. |
| 5,352,749 A | 10/1994 | DeChellis et al. |
| 5,391,529 A | 2/1995 | Sangokoya |
| 5,391,793 A | 2/1995 | Marks et al. |
| 5,462,999 A | 10/1995 | Griffin et al. |
| 5,693,838 A | 12/1997 | Sangokoya et al. |
| 5,731,253 A | 3/1998 | Sangokoya |
| 5,731,451 A | 3/1998 | Smith et al. |
| 5,744,656 A | 4/1998 | Askham |
| 5,834,571 A | 11/1998 | Bernier et al. |
| 5,922,631 A | 7/1999 | Sangokoya |
| 6,407,185 B1 | 6/2002 | Promel |

FOREIGN PATENT DOCUMENTS

| | | |
|---|---|---|
| EP | 0129368 A1 | 12/1984 |
| EP | 0 260 130 | 3/1988 |
| EP | 0 279 586 | 8/1988 |
| EP | 0 423 101 | 4/1991 |
| EP | 0 537 130 | 4/1993 |
| EP | 0 561 476 | 9/1993 |
| EP | 0 594 218 | 4/1994 |
| EP | 0 887 379 | 12/1998 |
| WO | WO 92/12182 | 7/1992 |
| WO | WO 94/10180 | 5/1994 |
| WO | WO 96/13529 | 5/1996 |
| WO | WO 97/10248 | 3/1997 |
| WO | WO 97/14700 | 4/1997 |

(Continued)

OTHER PUBLICATIONS

International Search Report and Written Opinion for Application No. PCT/EP2009/064613 Filed on Jan. 27, 2010.
John R. Severn, et al., "Bound but Not Gagged"—Immobilizing Single-Site Alpha-Olefin Polymerization Catalysts, Chem. Rev., 2005, pp. 4073-4147.
Metallocene-Based Polyolefins, Wiley Series in Polymer Science, 2000, pp. 365-377, John Wiley & Sons, Ltd.
V. C. Gibson, et al., in Angew. Chem. Int. Ed., engl., vol. 38, 1999, pp. 428-447.

Primary Examiner — Caixia Lu
(74) Attorney, Agent, or Firm — Warn Partners, P.C.

(57) ABSTRACT

Improved process for the preparation of an unsupported, heterogeneous olefin polymerization catalyst system, comprising an organometallic compound of a transition metal of Group 3 to 10 of the Periodic Table (IUPAC) or of an actinide or lanthanide in the form of solid particles comprising the steps of a) preparing a solution of catalyst components, including an aluminoxane, a compound being effective to form stable, liquid clathrates with aluminoxane and an organometallic compound of a transition metal of Group 3 to 10 of the Periodic Table (IUPAC 2007) or of an actinide or lanthanide, in a hydrocarbon solvent, yielding a two phase system with an upper solvent layer, which is separated, b) preparing a liquid/liquid emulsion system comprising a continuous phase in which said solution of the catalyst components forms a dispersed phase in the form of droplets, c) solidifying said dispersed phase to convert said droplets to solid particles and optionally recovering said particles to obtain said catalyst system, the catalysts system itself and its use for olefin polymerization.

16 Claims, 1 Drawing Sheet

FOREIGN PATENT DOCUMENTS

| | | |
|---|---|---|
| WO | WO 97/18218 | 5/1997 |
| WO | WO 97/28170 | 8/1997 |
| WO | WO 98/46616 | 10/1998 |
| WO | WO 98/47929 | 10/1998 |
| WO | WO 98/49208 | 11/1998 |
| WO | WO 98/56831 | 12/1998 |
| WO | WO 99/10353 | 3/1999 |
| WO | WO 99/12981 | 3/1999 |
| WO | WO 99/19335 | 4/1999 |
| WO | WO 99/41290 | 8/1999 |
| WO | WO 00/34341 | 6/2000 |
| WO | WO 01/70395 | 9/2001 |
| WO | WO 02/060963 | 8/2002 |
| WO | WO 03/051934 | 6/2003 |
| WO | WO 03/082879 | 10/2003 |
| WO | WO 2004/022571 | 3/2004 |
| WO | WO 2005/002744 | 1/2005 |
| WO | WO 2006/069733 | 7/2006 |

Figure 1: SEM images of the catalysts according to Example 2

Figure 2: SEM images of the polymer particles obtained with the catalyst of Example 2

PROCESS FOR THE PREPARATION OF AN UNSUPPORTED, SOLID METALLOCENE CATALYST SYSTEM AND ITS USE IN POLYMERIZATION OF OLEFINS

This application is a National Stage of International Application No. PCT/EP2009/064613, filed Nov. 4, 2009. This application claims priority to European Patent Application No. 08168708.9, filed on Nov. 10, 2008. The disclosures of the above applications are incorporated herein by reference.

This invention relates to an improved process for the preparation of an unsupported, solid metallocene catalyst system, to the use of the catalyst system in olefin polymerization and to the catalyst system per se.

In particular, the invention describes the use of an aluminoxane co-catalyst and an organic or inorganic compound, which can dissociate or partially dissociate into cationic and anionic species (M-X species), or an organosilicon compound, to form a clathrate aluminoxane composition and a metallocene complex, which subsequently form the catalyst system by using emulsion/solidification technology.

BACKGROUND ART

Many catalysts and processes are known for the preparation of olefin polymers. Ziegler-Natta (ZN) catalyst compositions and chromium oxide compounds have, for example, been found to be useful in the preparation of polyolefins.

Further the use of metallocene catalysts in olefin polymerization has been known for many years and has been found to afford polymer properties not easily available by using ZN catalysts. Metallocene compounds/procatalysts are conventionally activated using a cocatalyst such as an aluminoxane known from the literature to form the active metallocene catalyst species.

The first single-site catalysts to be developed were homogeneous, i.e. they were used in solution in the polymerization reaction. Due to the many drawbacks of homogeneous solution systems, several different approaches have been used to try to overcome the problems of the solution catalyst systems. Nowadays the widely used catalyst systems comprise heterogeneous catalysts, wherein catalyst components are supported on an external carrier. Such catalyst systems are described for example by Severn et al., Chem. Rev. 2005; 105(11); 4073-4147 or in the Handbook Tailor-Made Polymers: Via Immobilization of Alpha-Olefin Polymerization Catalysts of Severn et al.

The carriers used have a porous structure in order to facilitate catalyst impregnation into the support. Carrier materials are typically polymeric or inorganic supports, most typically silica, alumina or magnesium dichloride based materials.

However, the use of an external supported involves additional costs, the quality of the support must be carefully controlled and polymers made using supported catalysts can contain carrier residues which cause some problems.

For example in film applications this is an important feature since for polymers made by using such supported catalysts, the carrier residues may be visible in the film.

In recent years solid metallocene catalyst systems, providing the advantages of both homogenous and heterogeneous catalysts, were developed by using an emulsion/solidification technology for their preparation without using an external carrier, as for example disclosed in WO 03/051934 or WO 2006/069733, the contents of which are incorporated herein by reference.

The preparation of this kind of catalyst systems by using an emulsion/solidification technology is based on a liquid/liquid emulsion system comprising at least two phases, from which the catalyst particles forming the dispersed phase of the emulsion are separated. Due to the absence of inert material higher relative loadings of active metal can be reached, leading to higher activity compared to conventional silica supported catalysts.

Unfortunately such catalyst systems, prepared by the emulsion/solidification technology and comprising a metallocene procatalyst in combination with an aluminoxane co-catalyst, have also disadvantages.

For example, such catalyst systems have a tendency to dissolve to some extend in common solvents like pentane, heptane and toluene, which are used in several polymerization process steps as reaction medium. This solubility can lead to catalyst leaching, which is further associated with fouling problems in the reactor.

To solve the above mentioned disadvantages of solubility of the catalyst systems highly controlled catalyst pre-polymerization as part of the catalyst preparation and/or addition of a catalyst poison for deactivating dissolved catalyst particles are suggested in the state of the art.

Unfortunately, prepolymerization conditions have to be optimized for each single catalyst extra to ensure desirable polymer morphology. In addition, prepolymerization is expensive on a commercial scale due in part to the need for additional reactor hardware, solvents, and monomer.

WO 97/14700 describes the preparation of stable, liquid clathrate aluminoxane compositions obtained by the reaction in aromatic solvents of aluminoxanes, especially methyllaluminoxane, with an organic or inorganic compound, especially salts which can dissociate or partially dissociate into cationic and anionic species (M-X species) and of particulate solid aluminoxane-MX salt compositions.

Furthermore it is described in general that polymerization catalyst systems (metallocene or Ziegler-Natta) can be prepared using either the liquid clathrate aluminoxane salt compositions or the particulate solid aluminoxane-MX salt compositions. The catalyst systems can optionally be supported on solid carriers.

For example it is stated that the aluminoxane-MX composition can be initially reacted with a metallocene complex and then with the solid carrier support or the aluminoxane-MX composition can be first reacted with the support material and then with a metallocene complex. Such catalyst systems are effective to produce olefin polymers and especially ethylene polymers, propylene polymers and ethylene/alpha-olefin copolymers.

However, supported systems present problems as already stated above. It is difficult to get an even distribution of the catalyst components in the porous carrier material; and leaching of the catalyst components from the support can occur. Such drawbacks lead to unsatisfactory polymerization behaviour of the catalyst, and as a result the morphology of the polymer product thus obtained is also poor. Furthermore, the uneven distribution of the catalyst components in the support material can have an adverse influence on the fragmentation of the support material during the polymerization step. The support can also have an adverse effect on the activity of the catalyst, on its polymerization behaviour and on the properties of the end polymer.

The emulsion/solidification technology for preparing such catalyst systems is neither described nor disclosed in WO 97/14700.

In addition WO 98/47929 describes the preparation of stable, liquid clathrate aluminoxane compositions obtained by the reaction in aromatic solvents of aluminoxanes, especially methylaluminoxane, with a hydrocarbyloxysilane of the formula $(RO)_{4-n}R_nSi$, where R is, independently, a hydrocarbyl having up to about 18 carbon atoms and n is 0 to 3.

Such stable clathrates can be used for the preparation of polymerization catalyst systems as already described for WO 97/14700.

The catalyst systems show the same disadvantages as described for catalyst systems according to WO 97/14700.

Again the emulsion/solidification technology for preparing such catalyst systems is neither described nor disclosed in WO 97/14700.

WO 2004/022571 describes a process to prepare an unsupported single site catalyst which comprises the step of a) reacting an aluminoxane and a Lewis base in an optionally halogenated solvent to form a particulate suspension, b) reacting said suspension with a metallocene complex in an optionally halogenated hydrocarbon solvent and optionally c) isolating the olefin polymerization catalyst. According to the Examples of WO 2004/022571 the obtained particle morphology is only acceptable if such unsupported catalyst systems are used.

The emulsion/solidification technology for preparing such catalyst systems is neither described nor disclosed in WO 2004/022571.

Accordingly much development work has been done in the field of heterogeneous catalysts.

However, due to the complexity of the catalysts there is a continuous need for alternative or improved methods of preparing unsupported, solid metallocene catalyst systems by using the emulsion/solidification technology, which overcome the problems of the catalyst systems according to the state of the art and yield catalyst systems being insoluble or at least practically insoluble in hydrocarbons, which allow the production of polymers with good polymer particle morphology and without reactor fouling.

It was therefore an object of the invention to provide an improved process for preparing unsupported, solid metallocene catalyst systems by using the emulsion/solidification technology, which yields catalyst systems being insoluble or at least practically insoluble in hydrocarbons and allow the production of polymers with good polymer particle morphology and without reactor fouling.

This object was achieved by using a clathrated aluminoxane, instead of conventional aluminoxane, for preparing unsupported, solid metallocene catalyst systems by using the emulsion/solidification technology.

Thus in a first aspect, the present invention is therefore directed to an improved process for the preparation of an unsupported, heterogeneous olefin polymerization catalyst system, comprising an organometallic compound of a transition metal of Group 3 to 10 of the Periodic Table (IUPAC 2007) or of an actinide or lanthanide in the form of solid particles comprising the steps of a) preparing a solution of catalyst components, including an aluminoxane, a compound being effective to form clathrates with aluminoxane and an organometallic compound of a transition metal of Group 3 to 10 of the Periodic Table (IUPAC 2007) or of an actinide or lanthanide, in a hydrocarbon solvent, yielding a two phase system with an upper hydrocarbon solvent layer, which is separated, b) preparing a liquid/liquid emulsion system comprising a continuous phase in which said solution of the catalyst components forms a dispersed phase in the form of droplets, c) solidifying said dispersed phase to convert said droplets to solid particles and optionally recovering said particles to obtain said catalyst system.

Viewed from another aspect the invention provides a catalyst system obtainable by, e.g. obtained by, a process as hereinbefore described.

Viewed from yet another aspect the invention provides the use of a catalyst system as hereinbefore described in olefin polymerization.

Viewed from still further aspect the invention provides a process for the preparation of polyolefins comprising polymerizing at least one olefin in the presence of an olefin polymerization catalyst system as hereinbefore described.

In the first step of the process according to the invention a solution of catalyst components is formed.

According to the invention the catalyst components include an aluminoxane, a compound being effective to form clathrates with aluminoxane and an organometallic compound of a transition metal of Group 3 to 10 of the Periodic Table (IUPAC 2007) or of an actinide or lanthanide.

The aluminoxane employed in step a) can be any conventional aluminoxane as is known in the art.

Aluminoxanes are commercially available or can be prepared according to prior art literature for example by the hydrolysis of aluminium alkyls either by direct water addition or by treatment with salt hydrates. There are a variety of methods for preparing aluminoxane and modified aluminoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656 and European publications EP-A-0 561 476, EP-B1-0 279 586 and EP-A-0 594-218, and WO 94/10180, all of which are herein fully incorporated by reference.

Aluminoxanes are also called alumoxanes.

Preferably, $C_1$-$C_{10}$-alkylalumoxanes, particularly methylalumoxane or modified methylalumoxane, isobutylalumoxane, e.g. TIBAO (tetraisobutylalumoxane) or HIBAO (hexaisobutylalumoxane) are used for step a). More preferably methylalumoxane (MAO) is used. Most preferably MAO commercially available as 5 to 30 wt % solution in toluene is used.

The second compound used in step a) is a compound being effective to form a clathrate with the aluminoxane.

This compound being effective to form a clathrate with the aluminoxane can be an M-X compound or an organosilicon compound.

M-X compounds which are effective in forming clathrates with the aluminoxane are organic, inorganic or organometallic compounds which can potentially dissociate or partially dissociate into cationic ($M^+$) and anionic components ($X^-$). Such compounds are disclosed for example in WO 97/14700.

M can be an alkali or alkaline earth metal, like Na, K, Li, Mg or Ca.

X can be a halide, like F, Cl or Br, or a pseudohalide.

The term pseudohalide refers to moieties which are not halides but are generally considered to be a good leaving group in substitution reaction. Pseudohalides can include, for example, azides, cyanide, cyanate, thiocyanate, isocyanate, isothiocyanate, silicon groups, sulfur groups, nitrogen groups, oxygen groups, boron groups and phosphorous groups.

Non-limiting examples are alkali and alkaline earth halides or pseudo-halides such as KCl, KF, LiCl, CaCl$_2$, MgCl$_2$, MgF$_2$, NaF, KOSiR$_3$ or NaBO$_4$. R being a C$_1$-C$_6$-alkyl residue. The reaction of such compounds with an aluminoxane in a hydrocarbon solvent leads to the formation of clathrate compositions.

Other examples of M-X compounds include metal hydrides such as KH, LiH and alkyl, aryl and alkyl-aryl ammonium, phosphonium, sulfonium and other organometallic salts of halides and pseudo halides such as R$_4$NCl, MePh$_3$PBr, NaBPh$_4$, KB(C$_6$F$_5$)$_4$, LiR$_4$Al, which will effectuate clathrate formation by their reactions with aluminoxane in hydrocarbon solvents. R being a C$_1$-C$_8$-alkyl residue.

Preferably used M-X compounds are KCl, KF, NaF, LiCl, CaCl$_2$, MgCl$_2$, MgF$_2$, KH, LiH, KOSiR$_3$, NaBPh$_4$, Me$_4$NCl, (Octyl)$_3$NClMe, MePh$_3$PBr and KB(C$_6$F$_5$)$_4$.

More preferably used M-X compounds are KCl, KF, NaF, Me$_4$NCl, (Octyl)$_3$NClMe, KH, MePh$_3$PBr, NaBPh$_4$ and KOSiMe$_3$.

The molar ratio of aluminium, provided by the aluminoxane, and M (cationic moiety), provided by the M-X compound is in the range of 1:1 to 50:1, preferably from 5:1 to 30:1 and more preferably from 8:1 to 25:1.

Organosilicon compounds which are effective in forming clathrates with the aluminoxane can be selected from the group of hydrocarbyloxysilanes of the formula (RO)$_{4-n}$R$_n$Si where R is, independently, a hydrocarbyl group having up to about 18 carbon atoms (e.g., linear or branched alkyl, cycloalkyl, aryl, aralkyl) and n is 0 to 3; and hydrocarbylpolysiloxanes having from 2 to 6 silicon atoms in the molecule and which are separated from each other by an oxygen atom such that there is a linear, branched or cyclic backbone of alternating Si and oxygen atoms, with the remainder of the four valence bonds of each of the silicon atoms individually satisfied by a univalent hydrocarbyl group, R, as just defined. Preferred hydrocarbyl groups, R, are methyl, ethyl and phenyl. Examples of such organosilicon compounds include tetramethoxysilane, tetraethoxysilane, tetraphenoxysilane, methoxytrimethylsilane, ethoxytrimethylsilane, hexamethyldisiloxane, hexaethyldisiloxane, hexaphenyldisiloxane, tetramethyldiphenyldisiloxane, dimethyltetraphenyldisiloxane, hexamethylcyclotrisiloxane, octamethylcyclotetrasiloxane, octaphenylcyclotetrasiloxane, octamethyltrisiloxane, decamethyltetrasiloxane, dodecamethylpentasiloxane and tetradecamethylhexasiloxane.

Preferred organosilicon compounds are octamethyltrisiloxane, decamethyltetrasiloxane, octamethylcyclotetrasiloxane, methoxytrimethylsilane and tetraethoxysilane.

The molar ratio of aluminium, provided by the aluminoxane, and the organosilicon compound is in the range of 1:1 to 50:1, preferably from 5:1 to 30:1 and more preferably from 8:1 to 25:1.

Preferably used as clathrate forming compounds are the above described organosilicon compounds.

The third compound used in step a) is an organometallic compound of a transition metal of Group 3 to 10 of the Periodic Table (IUPAC 2007) or of an actinide or lanthanide.

The term "an organometallic compound of a transition metal" in accordance with the present invention includes any metallocene or non-metallocene compound of a transition metal which bears at least one organic (coordination) ligand and exhibits the catalytic activity alone or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC 2007), as well as lanthanides or actinides.

Accordingly, said organotransition metal compound may have the following formula I:

$$(L)_m R_n TA_q \tag{I}$$

wherein T is a transition metal as defined above and each A is independently a monovalent anionic ligand, such as a sigma-ligand, each L is independently an organic ligand which coordinates to T, R is a bridging group linking two ligands L, m is 1, 2 or 3, n is 0, 1 or 2, preferably 0 or 1, q is 1, 2 or 3, and m+q is equal to the valency of the metal.

In a more preferred definition, each L is independently (a) a substituted or unsubstituted cyclopentadienyl or a mono-, bi- or multifused derivative of a cyclopentadienyl which optionally bear further substituents and/or one or more hetero ring atoms from a Group 13 to 16 of the Periodic Table (IUPAC); or (b) an acyclic $\eta^1$- to $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or (c) a cyclic sigma-, $\eta^1$- to $\eta^4$- or $\eta$6-, mono-, bi- or multidentate ligand composed of unsubstituted or substituted mono-, bi- or multicyclic ring systems selected from aromatic or non-aromatic or partially saturated ring systems, and containing carbon ring atoms and optionally one or more heteroatoms selected from Groups 15 and 16 of the Periodic Table.

By "sigma-ligand" is meant a group bonded to the metal at one or more places via a sigma bond.

According to a preferred embodiment said organotransition metal compound (I) is a group of compounds known as metallocenes. Said metallocenes bear at least one organic ligand, generally 1, 2 or 3, e.g. 1 or 2, which is $\eta$-bonded to the metal, e.g. a $\eta^{2-6}$-ligand, such as a $\eta^5$-ligand. Preferably, a metallocene is a Group 4 to 6 transition metal, suitably titanocene, zirconocene or hafnocene, which contains at least one $\eta^5$-ligand, which is e.g. an optionally substituted cyclopentadienyl, an optionally substituted indenyl, an optionally substituted tetrahydroindenyl or an optionally substituted fluorenyl.

The metallocene compound may have a formula II:

$$(Cp)_m R_n TA_q \tag{II}$$

wherein:
each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand; the optional one or more substituent(s) being selected preferably from halogen, hydrocarbyl (e.g. C$_1$-C$_{20}$-alkyl, C$_2$-C$_{20}$-alkenyl, C$_2$-C$_{20}$-alkynyl, C$_3$-C$_{12}$-cycloalkyl, C$_6$-C$_{20}$-aryl or C$_7$-C$_{20}$-arylalkyl), C$_3$-C$_{12}$-cycloalkyl which contains 1, 2, 3 or 4 heteroatom(s) in the ring moiety, C$_6$-C$_{20}$-heteroaryl, C$_1$-C$_{20}$-haloalkyl, —SiR"3, —OSiR", —SR", —PR"2 or —NR"2, each R" is independently a hydrogen or hydrocarbyl, e.g. C$_1$-C$_{20}$-alkyl, C$_2$-C$_{20}$-alkenyl, C$_2$-C$_{20}$-alkynyl, C$_3$-C$_{12}$-cycloalkyl or C$_6$-C$_{20}$-aryl; or e.g. in case of —NR"2 the two substituents R" can form a ring, e.g. five- or six-membered ring, together with the nitrogen atom wherein they are attached to.

R is a bridge of 1-7 atoms, e.g. a bridge of 1-4 C-atoms and 0-4 heteroatoms, wherein the heteroatom(s) can be e.g. Si, Ge and/or O atom(s), whereby each of the bridge atoms may bear independently substituents, such as C$_1$-C$_{20}$-alkyl, tri(C$_1$-C$_{20}$- alkyl)silyl, tri($C_1$-$C_{20}$-alkyl)siloxy or $C_6$-$C_{20}$-aryl substituents); or a bridge of 1-3, e.g. one or two, hetero atoms, such as silicon, germanium and/or oxygen atom(s), e.g. —$SiR^1_2$, wherein each $R^1$ is independently $C_1$-$C_{20}$-alkyl, $C_6$-$C_{20}$-aryl or tri($C_1$-$C_{20}$-alkyl)silyl-residue, such as a trimethylsilyl-residue.

T is a transition metal of Group 4 to 6, such as Group 4, e.g. Ti, Zr or Hf.

Each A is independently a sigma-ligand, such as H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —SR", —PR"$_3$, —SiR"$_3$, —OSiR$_{13}$ or —NR"$_2$; each R" is independently hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom wherein they are attached to.

Each of the above mentioned ring moieties alone or as a part of a moiety as the substituent for Cp, X, R" or $R^1$ can further be substituted e.g. with $C_1$-$C_{20}$-alkyl which may contain Si and/or O atoms;

n is 0, 1 or 2, e.g. 0 or 1, m is 1, 2 or 3, e.g. 1 or 2, q is 1, 2 or 3, e.g. 2 or 3, wherein m+q is equal to the valency of T.

Said metallocenes of the formula (II) and their preparation are well known in the art.

Cp is preferably cyclopentadienyl, indenyl, tetrahydroindenyl or fluorenyl, optionally substituted as defined above and may further bear a fused ring of 3 to 7 atoms, e.g. 4, 5 or 6, which ring may be aromatic or partially saturated.

In a suitable subgroup of the compounds of formula (II), each Cp independently bears one or more substituents selected from $C_1$-$C_{20}$-alkyl, $C_6$-$C_{20}$-aryl, $C_7$-$C_{20}$-arylalkyl (wherein the aryl ring alone or as a part of a further moiety may further be substituted as indicated above), —OSiR"$_3$, wherein R" is as indicated above, preferably $C_1$-$C_{20}$-alkyl; X is H, halogen, $C_1$-$C_{20}$-alkyl, $C_1$-$C_{20}$-alkoxy, $C_6$-$C_{20}$-aryl, $C_7$-$C_{20}$-arylalkenyl or —NR"$_2$ as defined above, e.g. —N($C_1$-$C_{20}$-alkyl)$_2$; R is a methylene, ethylene or a silyl bridge, whereby the silyl can be substituted as defined above, e.g. a dimethylsilyl=, methylphenylsilyl= or trimethylsilylmethylsilyl=bridge; n is 0 or 1; m is 2 and q is two.

Preferably, R" is other than hydrogen.

A specific subgroup includes the well known metallocenes of Zr, Hf and Ti with one or two, e.g. two, q-ligands which may be bridged or unbridged cyclopentadienyl ligands optionally substituted with e.g. siloxy, alkyl and/or aryl as defined above, or with two unbridged or bridged indenyl ligands optionally substituted in any of the ring moieties with e.g. siloxy, alkyl and/or aryl as defined above, e.g. at 2-, 3-, 4- and/or 7-positions. As specific examples e.g. bis(alkylcyclopentadienyl)Zr (or Ti or Hf) dihalogenides can be mentioned, such as bis(n-butylcyclopentadienyl)ZrCl$_2$ and bis(n-butylcyclopentadienyl)HfCl$_2$, see e.g. EP-A129 368. Examples of compounds wherein the metal atom bears a —NR"$_2$ ligand are disclosed i.a. in WO-A-98/56831 and WO-A-00/34341. The contents of the above documents are incorporated herein by reference. Further metallocenes are described e.g. in EPA-260 130. Further examples of usable metallocenes may also be found e.g. from WO-A97/28170, WO-A-98/46616, WO-A-98/49208, WO-A-99/12981, WO-A-99/19335, WO-A98/56831, WO-A-00/34341, EP-A-423 101 and EP-A-537 130 as well as V. C. Gibson et al., in Angew. Chem. Int. Ed., engl., Vol 38, 1999, pp 428-447 and V. C. Gibson and S. K. Spitzmesser, in Chem. Rev. 2003; 103(1); pp 283-316, the disclosures of which are incorporated herein by reference.

Alternatively, in a further subgroup of the metallocene compounds, the metal bears a Cp group as defined above and additionally a $\eta^1$ or $\eta^2$ ligand, wherein said ligands may or may not be bridged to each other. This subgroup includes so called "scorpionate compounds" (with constrained geometry) in which the metal is complexed by a $n^5$ ligand bridged to a $\eta^1$ or $\eta^2$ ligand, preferably $\eta^1$ (for example a sigma-bonded) ligand, e.g. a metal complex of a Cp group as defined above, e.g. a cyclopentadienyl group, which bears, via a bridge member, an acyclic or cyclic group containing at least one heteroatom, e.g. —NR"$_2$ as defined above. Such compounds are described e.g. in WO-A-96/13529, the contents of which are incorporated herein by reference.

Any alkyl, alkenyl or alkynyl residue referred above alone or as a part of a moiety may be linear or branched, and contain preferably of up to 9, e.g. of up to 6, carbon atoms. Aryl is preferably phenyl or naphthalene. Halogen means F, Cl, Br or I, preferably Cl.

Another subgroup of the organotransition metal compounds of formula (I) usable in the present invention is known as non-metallocenes wherein the transition metal (preferably a Group 4 to 6 transition metal, suitably Ti, Zr or Hf) has a coordination ligand other than cyclopentadienyl ligand.

The term "non-metallocene'" herein means compounds, which bear no cyclopentadienyl ligands or fused derivatives thereof, but one or more non-cyclopentadienyl $\eta$- or $\sigma$-, mono-, bi- or multidentate ligand. Such ligands can be chosen e.g. from (a) acyclic, $\eta^1$- to $\eta^4$- or $\eta^6$-ligands composed of atoms from Groups 13 to 16 of the Periodic Table (IUPAC), e.g. an acyclic pentadienyl ligand wherein the chain consists of carbon atoms and optionally one or more heteroatoms from Groups 13 to 16 (IUPAC), and in which the open chain ligand may be fused with one or two, preferably two, aromatic or non-aromatic rings and/or bear further substituents (see e.g. WO 01/70395, WO 97/10248 and WO 99/41290), or (b) cyclic $\sigma$-, $\eta^1$- to $\eta^4$- or $\eta^6$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from Groups 15 and 16 of the Periodic Table (IUPAC) (see e.g. WO 99/10353). Bi- or multidentate ring systems include also bridged ring systems wherein each ring is linked via a bridging group, e.g. via an atom from Groups 15 or 16 of the Periodic Table, e.g. N, O or S, to the transition metal atom (see e.g. WO 02/060963). As examples of such compounds, i.a. transition metal complexes with nitrogen-based, cyclic or acyclic aliphatic or aromatic ligands, e.g. such as those described in the applicants earlier application WO-A-99/10353 or in the Review of V. C. Gibson at al., in Angew. Chem. Int. Ed., engl., Vol 38, 1999, pp 428-447 and V. C. Gibson and S. K. Spitzmesser, in Chem. Rev. 2003; 103(1); pp 283-316 or with oxygen-based ligands, such as Group 4 metal complexes bearing bidentate cyclic or acyclic aliphatic or aromatic alkoxide ligands, e.g. optionally substituted, bridged bisphenolic ligands (see i.a. the above review of Gibson et al.). Further specific examples of non-$\eta^5$ ligands are amides, amide-diphosphane, amidinato, aminopyridinate, benzamidinate, azacycloalkenyl, such as triazabicycloalkenyl, allyl, beta-diketimate and aryloxide. The disclosures of the above documents are incorporated herein by reference. It should be noted that the diversity does not affect the applicability of the process of the invention.

The preparation of metallocenes and non-metallocenes, and the organic ligands thereof, usable in the invention is well documented in the prior art, and reference is made e.g. to the above cited documents. Some of said compounds are also commercially available. Thus, said transition metal compounds can be prepared according to or analogously to the methods described in the literature, e.g. by first preparing the organic ligand moiety and then metallating said organic ligand (n-ligand) with a transition metal. Alternatively, a metal ion of an existing metallocene can be exchanged for another metal ion through transmetallation.

If several different transition metal compounds are used (mixed dual or multicatalyst systems), these can be any combinations of the above organometal compounds or of the above organometal compounds with other catalyst compounds (including Ziegler-Natta and chromium oxide systems), e.g. a combination at least of two or more a metallocenes, of a metallocene and a non-metallocene, as well as of a metallocene and/or a non-metallocene with a Ziegler-Natta catalyst system (which comprises typically a transition metal compound and a compound of a metal from Group 2 of the Periodic Table, such as a Mg compound).

The molar ratio of aluminium, provided by the aluminoxane, and the transition metal T is in the range of 1:1 to 10 000:1, preferably from 5:1 to 8 000:1, more preferably from 10:1 to 7 000:1, e.g. 100:1 to 4 000:1.

Typically in case of solid (heterogeneous) catalysts the ratio is from 10:1 to 1000:1, such as 100:1 to 500:1.

The quantity of cocatalyst to be employed in the catalyst of the invention is thus variable and depends on the conditions and the particular transition metal compound chosen in a manner well known to a person skilled in the art.

The reaction medium for step a) is a hydrocarbon solvent, including $C_4$-$C_{12}$ alkanes, like isobutane, hexane or octane and aromatic hydrocarbons such as for example toluene, benzene, xylenes, ethylbenzene, cumene mesitylene or cymene.

Preferably aromatic hydrocarbons are used. More preferably used is toluene.

For step a) it is possible to prepare first an aluminoxane clathrate and react this pre-formed clathrate with the organotransition metal compound of formula (I) (variant A) or to react first the aluminoxane with the organotransition metal compound of formula (I) with subsequent clathrate formation (variant B).

Ad Variant A:

According to variant A aluminoxane clathrates are first formed by adding the clathrate forming compound to the aluminoxane, in a molar ratio as defined above, in a hydrocarbon solvent.

The starting concentration of aluminoxane in the solvent is not particularly critical and usually ranges from 5 to 30 wt % solution.

As solvent a hydrocarbon solvent as defined above, preferably an aromatic hydrocarbon solvent, such as for example toluene, benzene, xylenes, ethylbenzene, cumene mesitylene or cymene is used. More preferably used is toluene.

The reaction temperature is chosen to provide a clathrate. Such a reaction is characterized by the formation of a two phase system comprising two stable immiscible organic layers, which remain intact such that the upper hydrocarbon solvent layer can be separated from the lower aluminoxane clathrate containing layer.

Although the use of ambient temperatures is most convenient, i.e. from 0 to 30° C., some compounds require elevated temperatures up to 80° C. or higher in order to form a clathrate. An art skilled person can easily determine experimentally a suitable temperature for any of the clathrate forming compounds.

Preferably methylaluminoxane (MAO) is used for variant A. More preferably commercially available solutions of MAO in toluene are employed. Such solutions are available as 5 to 30 wt % solutions in toluene.

Advantageously the MAO clathrate forms the lower clathrate layer and trimethylaluminium (unreacted starting material from the preparation of MAO) is extracted into the toluene rich upper phase, so that the MAO clathrate contains essentially not trimethylaluminium as indicated by pyridine titration.

For further processing the clathrate containing lower phase is separated from the upper solvent layer by conventional separation techniques, for example by decantation or draining.

Optionally the separated aluminoxane clathrate phase can be washed before further use. Preferably the aluminoxane clathrate is washed once or up to 5 times, preferably once to three times, with the solvent used for its preparation. Preferably an aromatic hydrocarbon solvent, more preferably toluene is used for the preparation of the clathrate and for the washing step.

The pre-formed clathrate is then reacted, preferably under stirring, with the organotransition metal compound of formula (I), as described above, under inert atmosphere of for example $N_2$ or Argon at temperatures between 10 and 40° C., preferably between 15 and 35° C. and more preferably between 20 and 30° C., for example at room temperature.

As starting solution for step b) the aluminoxane clathrate/ organotransition metal containing phase is obtained.

Ad Variant B:

According to variant B the aluminoxane is first reacted with the organotransition metal compound of formula (I) in a hydrocarbon solvent, as disclosed above. The formed solution is further reacted with the clathrate forming compound leading again to the formation of a two phase system comprising two stable immiscible organic layers, which remain intact such that the upper aromatic solvent layer can be separated from the lower aluminoxane clathrate/organotransition metal containing layer.

The reaction is again performed preferably under stirring and under inert atmosphere of or example $N_2$ or Argon at temperatures between 10 and 40° C., preferably between 15 and 35° C. and more preferably between 20 and 30° C., for example at room temperature.

The upper phase is discarded and the lower phase is optionally washed before further use. Preferably the clathrate containing phase is washed once or up to 5 times, preferably once to three times, with the solvent used for its preparation. Preferably an aromatic hydrocarbon, more preferably toluene is used for the preparation of the clathrate and for the washing step.

For further processing in step b) the separated clathrate/ organotransition metal phase is be used.

In step b) a liquid/liquid emulsion system comprising a continuous phase in which said solution of the catalyst components forms a dispersed phase in the form of droplets is prepared.

Said solution of the catalyst components comprises the separated clathrate/organotransition metal compound containing lower phase obtained according to variant A or B.

The solution of the catalyst components is dispersed in a solvent immiscible therewith to form an emulsion. In this emulsion said separated clathrate/organotransition metal compound containing phase of step a) forms the dispersed phase in the form of droplets and the solvent immiscible with said solution forms the continuous phase.

The principles for preparing two phase emulsion system are known in the chemical filed. Thus, in order to form the two phase liquid system, the separated clathrate/organotransition metal compound phase obtained according to step a) and the solvent used as the continuous liquid phase have to be essentially immiscible at least during the dispersing step. This can be achieved in a known manner, as described for example in WO 03/051934 or WO 2006/069733, e.g. by choosing said two liquids and/or the temperature of the dispersing step/solidifying step accordingly.

The immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi- or multiphasic system as known in the art.

An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

The dispersing step can be effected as described in WO 03/051934, e.g. by mixing or by the so called phase change method.

Finally the catalyst components of the dispersed phase are solidified (solidification step c)).

The solidification step c) can be effected as described in WO 03/051934.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The solid particles formed can be isolated by conventional separation methods.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 m$^2$/g, still more preferably less than 20 m$^2$/g, yet more preferably less than 15 m$^2$/g, yet still more preferably less than 10 m$^2$/g and most preferably less than 5 m$^2$/g, wherein said particles are obtained by the process as described above.

For further details, embodiments and examples of the solidification methods reference is made e.g. to the above cited international patent application WO 03/051934.

The reaction steps b) and c) may be carried out batch wise or at least one of steps (b) to (c) of the above catalyst preparation process is carried out in a continuous, rather than in a batch wise manner.

Details, embodiments and examples for the semi-continuous or continuous process for steps b) and c) are described for example in WO 2006/069733, the contents of which are incorporated herein by reference.

With the above described preparation method unsupported, solid catalyst systems being insoluble in hydrocarbons are yielded.

If organosilicon compounds are used as clathrate forming compound the catalyst systems yielded further show improved productivity compared to catalyst systems prepared by the "classical" emulsion/solidification technology without the formation of a clathrate.

Therefore the present invention is also related to an unsupported, solid catalyst system being insoluble or at least practically insoluble in hydrocarbons, avoiding reactor fouling during polymerization and, in case of catalyst systems containing an organosilicon clathrated aluminoxane, showing improved productivity obtainable by a process as described above.

Furthermore this advantageous catalyst system needs no catalyst pre-polymerization step in order to achieve the desired properties of being insoluble in hydrocarbons. Nevertheless a pre-polymerization step can be carried out, if desired.

Anyway, the catalyst system according to the present invention shows significantly reduced solubility in hydrocarbons compared to state of the art heterogeneous, non prepolymerized catalyst systems comprising aluminoxane and thus reduced catalyst residues in the polymer product.

The present invention is further related to the use of the above defined catalyst system for olefin polymerization to yield polyolefins and the polyolefins produced with such a catalyst system.

Suitable polyolefins comprise polyethylene and polypropylene homopolymers and also polyethylene, polypropylene and polypropylene/ethylene copolymers comprising from 0 to 40 wt % $C_3$ to $C_{30}$-alpha-olefin or $C_4$ to $C_{30}$-diene-derived units, and more particularly a copolymer or terpolymer of ethylene and/or propylene with 0 to 10 wt % alkenes, for example 1-propene, 1-butene, 1-pentene, 4-methyl-pent-1-ene, 1-hexene, cyclohexene, 1-octene and norbornene, or dienes, for example butadiene, hexadiene or octadiene.

In a preferred embodiment the polyolefins produced by using the catalyst according to the invention are ethylene polymers, which contain as comonomers 0 to 40 wt % $C_3$ to $C_{30}$-alpha-olefins, preferably $C_3$ to $C_{10}$-alpha-olefins, more preferably $C_3$ to $C_6$-alpha-olefins, and most preferably butene or hexene, or mixtures thereof.

The polyolefin composition further can show unimodal, bimodal or multimodal molecular weight distribution. Bimodal or multimodal polyolefins can be produced in dual or multistage and -reactor processes which are known in the art and for example are described by F. P. Alt et al. in MACROMOL. SYMP., 135-143 (2001) and METALLOCENE-BASED POLYOLEFINS 366-378 (2000); and U.S. Pat. No.

6,407,185, U.S. Pat. No. 4,975,485, U.S. Pat. No. 4,511,704 or in single reactors with the use of a plurality of catalysts.

Any method of olefin polymerization—for example, a gas phase, slurry phase, solution polymerization process or any combinations thereof—that is known for the polymerization of olefins to form polyolefins in combination with the catalysts system of the invention can be used.

Polymerization can be a one stage or a two or multistage polymerization process, carried out in at least one polymerization reactor. Multimodal polymers with respect to the molecular weight distribution (MWD) are produced in a multistage process, where low molecular weight and higher molecular weight polymers are produced in different polymerization steps, in any order. Different combinations for producing multimodal polymers can be used, e.g. gas-gas phase, slurry-slurry phase, slurry-gas phase processes; slurry-gas phase polymerization being a preferred one. Unimodal polymers can be produced in a one stage polymerization, although more then one stage is possible, but then polymers with approximately the same molecular weight are produced in each stage. Any type of polymerizations as listed above are possible, however, slurry process being one preferred process.

In addition to the actual polymerization the process configuration can comprise any pre- or post reactors.

The catalyst system according to the invention may be introduced into the polymerization reactor by any suitable means regardless of the type of polymerization reactor used. In one embodiment, the catalyst system is fed to the reactor in a substantially dry state, meaning that the isolated solid form of the catalyst has not been diluted or combined with a diluent prior to entering the reactor. In another embodiment, the catalyst system is combined with a diluent and fed to the reactor; the diluent in one embodiment is an alkane, such as a $C_4$ to $C_{20}$-alkane, toluene, xylene, mineral or silicon oil, or combinations thereof, such as described in, for example, U.S. Pat. No. 5,290,745.

Generally the quantity of catalyst system used will depend upon the nature of the catalyst system, the reactor types and conditions and the properties desired for the polymer product. Conventional catalyst quantities, such as described in the publications referred herein, may be used.

The reactor setup is not particularly limited and can be any reactor setup known to the skilled person. Suitable types of reactors and means for operating the reactors are for example described in U.S. Pat. Nos. 4,003,712, 4,588,790, 4,302,566, 5,834,571, 5,352,749, 5,352,749 and 5,462,999, which are all fully incorporated herein by reference.

For slurry reactors, e.g. loop reactors, the reaction temperature will generally be in the range of 50 to 110° C. (e.g. 60-100, or 70 to 110° C.), the reactor pressure will generally be in the range of 20 to 80 bar (e.g. 30-70 bar), and the residence time will generally be in the range of 0.3 to 5 hours (e.g. 0.5 to 2 hours). The diluent used will generally be an aliphatic hydrocarbon having a boiling point in the range –70 to +100° C. In such reactors, polymerization may if desired be effected under supercritical conditions.

For gas phase reactors, the reaction temperature used will generally be in the range of 50 to 130° C. (e.g. 60 to 115° C., or 60 to 100° C.), the reactor pressure will generally be in the range of 5 to 60 bar, preferably 10 to 40 bar and the residence time will generally be 1 to 8 hours. The gas used will commonly be a non-reactive gas such as nitrogen together with monomer.

Hydrogen may be introduced into a reactor to control the molecular weight of the polymer as is well-known and routine in the art. In one embodiment, the mole ratio of hydrogen to total olefin monomer in the circulating gas stream is in a range of from 0.001 or 0.002 or 0.003 to 0.014 or 0.016 or 0.018 or 0.024, wherein a desirable range may comprise any combination of any upper mole ratio limit with any lower mole ratio limit described herein. Expressed another way, the amount of hydrogen in the reactor at any time may range from 1000 ppm to 20,000 ppm in one embodiment, and from 2000 to 10,000 in another embodiment, and from 3000 to 8,000 in yet another embodiment, and from 4000 to 7000 in yet another embodiment, wherein a desirable range may comprise any upper hydrogen limit with any lower hydrogen limit described herein.

The invention therefore also provides a process for producing a polymer composition comprising at least (i) an alpha-olefin homo- or copolymer component as defined above, wherein alpha-olefin monomers, optionally together with one or more comonomers, are polymerized in the presence of the special catalyst system according to the invention. In case the polymer composition consists of component (i) the process is a single stage process.

The invention further provides a process for producing a polymer composition comprising at least two different alpha-olefin homo- or copolymer components (i) and (ii) as defined above or in claims below, wherein each component is produced by polymerizing alpha-olefin monomers, optionally together with one or more comonomers, in the presence of the polymerization catalyst system according to the invention in a multistage polymerization process using one or more polymerization reactors, which may be the same or different, e.g. at least loop-loop, gas-gas or any combination of loop and gas. Each stage may be effected in parallel or sequentially using same or different polymerization method. In case of a sequential stages each components, e.g. (i) and (ii), may be produced in any order by carrying out the polymerization in each step, except the first step, in the presence of the polymer component formed, and preferably the catalyst system used, in the preceding step. Alternatively, the same or different catalyst system can be added in the subsequent step(s).

In one embodiment the process for producing any of the above polymer composition comprising (i) an alpha-olefin homopolymer or copolymer component and, optionally, (ii) an alpha-olefin homopolymer or copolymer component includes the steps of:

(a) polymerizing in a slurry reactor zone, preferably a loop reactor, alpha-olefin monomers, optionally together with one of more comonomers, in the presence of the catalyst system according to the invention to produce polymer component (i), and (b) optionally transferring the reaction product of step (a) to a subsequent gas phase reactor zone and polymerizing alpha-olefin monomers, optionally together with one or more comonomers, in the presence of the reaction product of step (a) to produce polymer component (ii) for obtaining the polymer composition, and (c) recovering the obtained composition.

A preferred multistage process is a "loop-gas phase"-process, such as developed by Borealis A/S, Denmark (known as BORSTAR® technology) described e.g. in patent literature, such as in EP 0887 379, in WO92/12182 or in WO 2005/002744.

The polymer compositions produced according to the invention can be used for a great variety of applications, like for example for blown films, pipe, extrusion coating, wire and cable jacketing, injection moulding, blow moulding or rotomoulding.

Methods:
Molecular Weights, Molecular Weight Distribution (Mn, Mw, MWD)—GPC

The weight average molecular weight Mw and the molecular weight distribution (MWD=Mw/Mn wherein Mn is the number average molecular weight and Mw is the weight average molecular weight) was measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

The bulk density of the polymer powder was determined according to ASTM D 1895.

Comonomer content was determined in a known manner based on Fourier transform infrared spectroscopy (FTIR) determination using Nicolet Magna 550 IR spectrometer together with Nicolet Omnic FTIR software calibrated with $^{13}C$-NMR Al, K and Zr Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours. The analysis was run at room temperature using a Thermo Elemental IRIS Advantage XUV Inductively Coupled Plasma—Atomic Excitation Spectrometer (ICP-AES) which was calibrated immediately before analysis using a blank (a solution of 5% $HNO_3$, 3% HF in DI water), a low standard (10 ppm Al in a solution of 5% $HNO_3$, 3% HF in DI water), a high standard (50 ppm Al, 50 ppm K, 20 ppm Zr in a solution of 5% $HNO_3$, 3% HF in DI water) and a quality control sample (20 ppm Al, 20 ppm K, 10 ppm Zr in a solution of 5% $HNO_3$, 3% HF in DI water). The content of zirconium was monitored using the 339.198 nm line, the content of aluminium via the 396.152 nm line and the potassium using the 766.490 nm line. The reported values, required to be between 0 and 100, or further dilution is required, are an average of three successive aliquots taken from the same sample and are related back to the original catalyst using equation 1.

$$C = \frac{R \times V}{M} \quad \text{Equation 1}$$

Where: C is the concentration in ppm, related to % content by a factor of 10,000
R is the reported value from the ICP-AES
V is the total volume of dilution in ml
M is the original mass of sample in g
If dilution was required then this also needs to be taken into account by multiplication of C by the dilution factor.

The catalyst productivity is defined as the amount of polymer in kilograms obtained per gram solid catalytic component used (e.g. kg PE/g catalyst). (Polymerization conditions: 60 min at 80° C.)

EXAMPLES

All manipulations were performed under an inert atmosphere of either $N_2$ or Argon using standard Schlenk techniques or gloveboxes.

Example 1

Octamethyltrisiloxane Clatherated MAO

Complex Preparation

The metallocene complex rac-ethylenebis[2-(tert-butyldimethylsiloxy)indenyl]zirconium dichloride (176 mg, prepared according to Leino, R. et al. *Organometallics* 1996, 15, 2450) was weighed in a septa bottle and subsequently admixed with methylaluminoxane (13.2 g, 30 wt % MAO in toluene, 13.78 wt % Al, supplied by Albemarle). The solution was stirred for 60 minutes at room temperature, after which octamethyltrisiloxane (OMTS) (0.80 g) was added to the reaction mixture and stirred the solution overnight at room temperature. Stirring was then stopped, two separate phases formed. The upper, colourless phase was discarded, whilst the lower orange/yellow phase was washed with toluene (2 times, 5 ml).

Emulsion Formation 150 ml of toluene saturated (previously saturated at 0° C.) perfluoro-1,3-dimethylcyclohexane (94%, F2 Chemicals Ltd) were added to a baffled glass reactor with rotostator stirrer and cooled to 0° C. The rotostator was set to 1000 rpm and the above obtained clathrate/complex mixture was added to the reactor followed by the surfactant 3-perfluorooctyl-1,2-propenoxide (0.42 ml, 96% Sigma-Aldrich). The stirring speed was increased to 8000 rpm to generate an emulsion.

Solidification 20 ml of the emulsion were rapidly siphonated into a stirred (400 rpm) glass reactor which contained 150 ml of pure perfluoro-1,3-dimethylcyclohexane at +90° C. Stirring was continued for 15 min before the reaction mixture was allowed to cool to room temperature before the stirring was ceased.

Isolation

The catalyst was allowed to settle for 45 min before the liquid phase was siphonated away yielding an orange/yellow solid powder which was dried for a further 2 hours at 50° C. over a flow of Argon.

Molar ratios: Al:Zr=260:1; Al:OMTS=20:1

Example 2

KCl Clatherated MAO

Example 2 was prepared according to Example 1, but KCl (0.51 g, 99.5% Merck) was added in place of octamethyltrisiloxane, resulting in a pale yellow solid.

Molar ratios: Al:Zr=260:1; Al:K=10:1

Example 3

Methyltrioctylammonium Chloride Clatherated MAO

Example 3 was prepared according to Example 1, but methyltrioctylammonium (MTOA) chloride (1.36 g, Fluka) was added in place of octamethyltrisiloxane, resulting in a yellow solid.

Molar ratios: Al:Zr=260:1; Al:MTOA=20:1

Example 4

MAO+Clatherating Agent

Complex Preparation

Potassium chloride (0.51 g, 99.5% Merck) was added to methylaluminoxane (13.2 g, 30 wt % MAO in toluene, 13.78 wt % Al, supplied by Albemarle) and the resultant slurry was stirred overnight. Stirring was then stopped and two separate phases were formed. The upper phase colourless phase was discarded, whilst the lower colourless and more viscous phase washed with toluene (2 times 5 ml).

The metallocene complex rac-ethylenebis[2-(tert-butyldimethylsiloxy)indenyl]zirconium dichloride (162 mg, prepared according to Leino, R. et al. *Organometallics* 1996, 15, 2450) was dissolved in a minimum amount of toluene (ca. 1 ml) and was subsequently added to the lower viscous clathrate phase isolated above to yield a viscous orangeyellow solution.

Emulsion formation, solidification and isolation procedures of the experiment were conducted under extensively the same conditions to example 1.

Molar ratios: Al:Zr=260:1; Al:K=10:1

Comparative Example 1

Non-Clatherated MAO

Complex Preparation 5 ml of 30 wt % methylalumoxane in toluene (MAO, 13.78 wt % Al, supplied by Albemarle) were admixed with 57 mg of rac-ethylenebis[2-(tert-butyldimethylsiloxy)indenyl]zirconium dichloride (prepared according to Leino, R. et al. *Organometallics* 1996, 15, 2450) and 3-perfluorooctyl-1,2-propeneoxide (96%, Sigma-Aldrich) surfactant-solution (0.2 ml of a stock solution made from 1 ml surfactant 3-perfluorooctyl-1,2-propeneoxide and 4 ml of perfluoro-1,3-dimethylcyclohexane).

Emulsion Formation 50 ml of dried perfluoro-1,3-dimethylcyclohexane (94%, F2 Chemicals Ltd) were placed in a 100 ml emulsion reactor. The contents was subsequently bubbled with nitrogen for 15 minutes, and cooled to 0° C. for 20 min. An emulsion was then generated by adding the above mentioned activated complex solution and stirring with 554 rpm for 15 min.

Solidification

Approximately 75% of the above emulsion was siphoned into separate vessel containing 150 ml of stirred (435 rpm) and heated perfluoro-1,3-dimethylcyclohexane (98° C.) using a Teflon tube. The temperature of the contents decreased between 76° C. to 80° C. while adding the emulsion. A precipitate formed immediately.

Isolation

Figure 1:
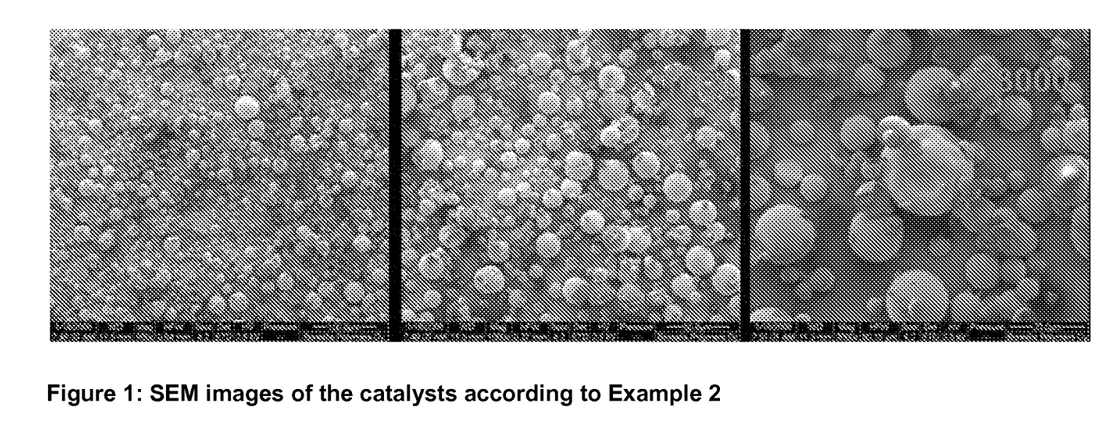
FIG. 1 is SEM images of a catalyst according to Example 2.

The mixture was allowed to cool to 32° C. under stirring for 35 min. Stirring was then ceased and the catalyst slurry was allowed to settle. The liquid was siphoned out and the remaining pale-yellow catalyst dried in argon flow at 50° C. for two hours In FIG. 1 scanning electron microscopy (SEM) images of the catalyst according to Example 2 are shown. These images show the good catalyst morphology for the catalyst according to the invention (Example 2)

Ethylene-co-1-hexene Polymerization Procedure

Polymerizations were carried out in a Büchi 5 L stainless steel autoclave reactor equipped with a paddle stirrer and a continuous supply of ethylene. Ethylene (>99.95%), nitrogen (>99.999%) and propane (>97%), 1-hexene (>99%) are further treated with sets of purifiers removing selectively $O_2$, $H_2O$, CO, $CO_2$ and acetylene.

An appropriate amount of the catalysts prepared according to Example 1, 2 and Comparative Example 1 was charged to a feeding vessel in glove box after which the feeding vessel is transferred to the reactor. The autoclave is purged with nitrogen and charged with propane (1.1 kg), ethylene (150 g) and 1-hexene (55 ml) at room temperature. The reactor temperature is then raised to 60° C. at which point the catalyst is injected under $N_2$ over pressure. The reactor temperature is immediately reset to 80° C. (time from 60-80° C. ca. 5-8 min) and ethylene is feed on demand to maintain 38 bar total pressure in the reactor. The polymerization experiment is terminated 60 min after the 80° C. set point is reached, via rapid venting the reactor contents. The polymer sample is then collected and allowed to dry in a well vented fume-hood overnight.

Further parameters of the polymerization process and of the polyethylene copolymer samples can be seen from Table 1:

| Catalyst polymerization | Example 1 | Example 2 | Comparative Example 1 |
|---|---|---|---|
| Catalyst amount(mg) | 31.5 | 128 | 40.3 |
| Productivity (kgPol/g cat) | 10.5 | 0.19 | 7.6 |
| Bulk density(kg/m$^3$) | 402 | n.m. | n.m |
| Hexene content by FTIR (wt %) | 3.7 | n.m. | 4.5 |
| MFR$_{21kg}$ | 0.81 | n.m. | n.m. |
| Mn (g/mol) | 70600 | n.m. | 65800 |
| Mw (g/mol) | 209000 | n.m. | 233000 |
| MWD (None) | 3 | n.m. | 3.5 |
| Mz (g/mol) | 430000 | n.m. | 499000 |
| Reactor Fouling | none | none | Heavy fouling |
| Polymer Particle Morphology | Good | Good | Very poor homogeneous polymerization like | n.m. . . . not measured

Figure 2:
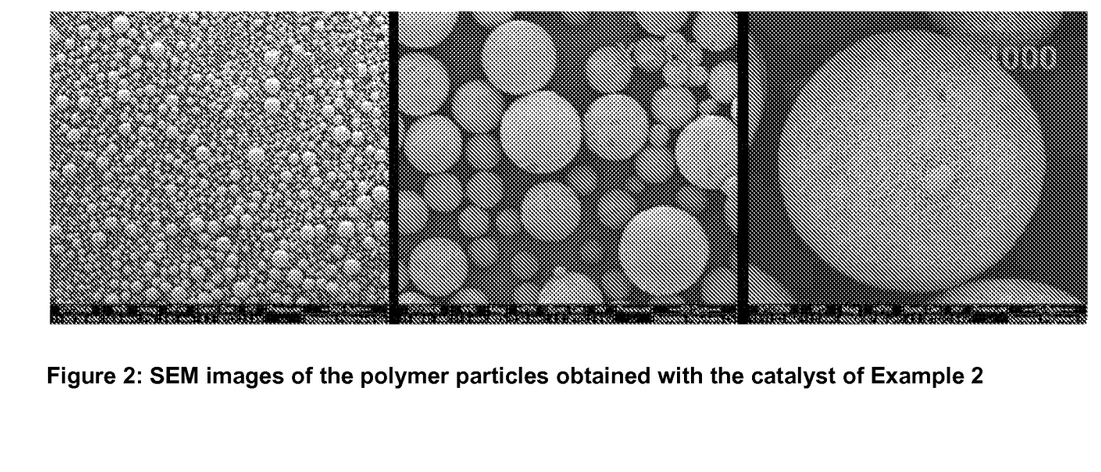
FIG. 2 is SEM images of polymer particles obtained with the catalyst of Example 2.

In FIG. 2 scanning electron microscopy (SEM) images of the polymer produced with the catalyst according to Example 2 are shown. These images clearly illustrate the good polymer particle morphology of the obtained polymer.

Solubility Tests

Solubility of the catalyst according to Example 2 to pentane was studied by weighing approximately 40 mg of the catalyst into a septabottle followed by 5 ml of pentane. The catalysts slurry was then vigorously stirred with a magnetic stirrer and no colour change in pentane was observed. Mixing was continued but even after 16 hours the pentane layer stayed colourless, which is a clear indication for the insolubility of the catalyst in pentane.

We claim:

1. Process for the preparation of an unsupported, heterogeneous olefin polymerization catalyst system, comprising an organometallic compound of a transition metal of Group 3 to 10 of the Periodic Table (IUPAC 2007) or of an actinide or lanthanide in the form of solid particles comprising the steps of
   a) preparing a solution of catalyst components, including an aluminoxane, a compound being effective to form clathrates with aluminoxane and an organometallic compound of a transition metal of Group 3 to 10 of the Periodic Table (IUPAC 2007) or of an actinide or lanthanide, in a hydrocarbon solvent, yielding a two phase system with an upper solvent layer, which is separated, b) preparing a liquid/liquid emulsion system comprising a continuous phase in which said solution of the catalyst components forms a dispersed phase in the form of droplets, c) solidifying said dispersed phase to convert said droplets to solid particles and optionally recovering said particles to obtain said catalyst system, wherein in step a) the molar ratio of aluminium, provided by the aluminoxane employed, and the transition metal, provided by the organometallic compound employed, is in the range of 100:1 to 500:1.

2. A process according to claim 1 wherein said aluminoxane in step a) is methylaluminoxane.

3. A process according to claim 1 wherein said compound being effective to form clathrates with aluminoxane is an M-X compound or an organo-silicon compound.

4. A process according to claim 3 wherein the M-X compound being effective to form clathrates with aluminoxanes in step a) is an organic, inorganic or organometallic compounds which can potentially dissociate or partially dissociate into cationic and anionic components and are selected from the group consisting of alkali and alkaline earth halides or pseudo-halides, metal hydrides and alkyl, aryl and alkylaryl ammonium, phosphonium and sulfonium salts of halides and pseudo halides which will effectuate clathrate formation by their reactions with aluminoxane in hydrocarbon solvents.

5. A process according to claim 4 wherein said M-X compound is selected from the group consisting of KCl, KF, NaF, KH, LiH, $KOSiR_3$, $NaBPh_4$, $Me_4NCl$, $(Octyl)_3NClMe$, $MePh_3$ and $KB(C_6F_5)_4$.

6. A process according to claim 3 wherein the organosilicon compounds which are effective in forming stable, liquid clathrates with the aluminoxane are selected from the group consisting of hydrocarbyloxysilanes of the formula $(RO)_{4-n}R_nSi$ where R is, independently, a hydrocarbyl group having up to about 18 carbon atoms and n is 0 to 3; and hydrocarbylpolysiloxanes having from 2 to 6 silicon atoms in the molecule and which are separated from each other by an oxygen atom such that there is a linear, branched or cyclic backbone of alternating Si and oxygen atoms, with the remainder of the four valence bonds of each of the silicon atoms individually satisfied by a univalent hydrocarbyl group, R, as defined for the hydrocarbyloxysilanes.

7. A process according to claim 1 wherein the organometallic compound of a transition metal is a compound of formula (I) (I)

$$(L)_m R_n TA_q \qquad (I)$$

wherein T is a transition metal as defined in claim 1 and each A is independently a sigma-ligand, each L is independently an organic ligand which coordinates to T, R is a bridging group linking two ligands L, m is 1, 2 or 3, n is 0, 1 or 2, q is 1, 2 or 3, and m+q is equal to the valency of the metal.

8. A process according to claim 7 wherein the organometallic compound of a transition metal is a metallocene compound of formula (II)

$$(Cp)_m R_n TA_q \qquad (II)$$

wherein
each Cp independently is an unsubstituted or substituted and/or fused homo- or heterocyclopentadienyl ligand; the optional one or more substituent(s) being selected from the group consisting of halogen, $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl, $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR", —SR", —PR"2 and —NR"2, each R" is independently a hydrogen or $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or in case of —NR"2, the two substituents R" can form a ring together with the nitrogen atom wherein they are attached to, R is a bridge of 1-7 atoms and 0-4 heteroatoms, wherein the heteroatom(s) can be Si, Ge and/or O atom(s), whereby each of the bridge atoms may bear independently substituents selected from the group consisting of $C_1$-$C_{20}$-alkyl, tri($C_1$-$C_{20}$-alkyl)silyl, tri($C_1$-$C_{20}$-alkyl)siloxy and $C_6$-$C_{20}$-aryl substituents; or a bridge of 1-3 hetero atoms selected from the group consisting of silicon, germanium and oxygen atom(s), T is a transition metal selected from Ti, Zr or Hf, each A is independently H, halogen, $C_1$-$C_{20}$-alkyl, $C_1$-$C_{20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —SR", —PR"$_3$, —SiR"$_3$, —OSiR"$_3$ or —NR"$_2$; each R" is independently hydrogen or $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or in case of —NR"$_2$, the two substituents R" can form a ring together with the nitrogen atom wherein they are attached to, n is 0 or 1, m is 1 or 2, q is 2 or 3, wherein m+q is equal to the valency of T.

9. A process according to claim 1 wherein the hydrocarbon solvent used in step a) is selected from the group consisting of $C_4$-$C_{12}$ alkanes, toluene, benzene, xylenes, ethylbenzene, cumene, mesitylene and cymene.

10. A process according to claim 9 wherein the solvent used in step a) is toluene.

11. A process according to claim 1 wherein in step a)
according to a first variant A:
first a clathrate with aluminoxane is prepared by reacting a clathrate forming compound with aluminoxane in the hydrocarbon solvent, yielding a two phase system comprising two stable immiscible organic layers, which remain intact such as if desired the upper solvent layer can be separated from the lower aluminoxane clathrate containing layer, and then reacting this pre-formed clathrate, either in the form of the two phase system or in the form of the separated lower aluminoxane clathrate containing layer, with the organometallic compound,
or according to a second variant B:
first the aluminoxane is reacted with the organometallic compound in the hydrocarbon solvent with subsequent clathrate formation by adding the clathrate forming compound, yielding a two phase system comprising two stable immiscible organic layers, which remain intact such as if desired the upper solvent layer can be separated from the lower aluminoxane clathrate/organometallic containing layer.

12. A process according to claim 3 wherein in step a) the molar ratio of aluminium, provided by the aluminoxane employed, and M, provided by the M-X compound, respectively organosilicon compound is in the range of 1:1 to 50:1.

13. A process according to claim 1 wherein in step b) the catalyst component containing solution, including aluminoxane, clathrate forming compound and organometallic compound is mixed with an immiscible solvent which forms the continuous phase of the liquid/liquid emulsion system and in which said solution of the catalyst components forms a dispersed phase in the form of droplets.

14. A process according to claim 13 wherein in step b) said immiscible solvent which forms the continuous phase comprises a fluorinated hydrocarbon, a functionalized derivative thereof or mixtures thereof.

15. A process according to claim 1 wherein in step b) an emulsifying agent is present during the formation of said emulsion.

16. A process according to claim 1 wherein in step c) the solidification is effected by a temperature change treatment.

* * * * *